United States Patent [19]

Siegel

[11] 4,368,064

[45] Jan. 11, 1983

[54] METHOD FOR CLEAVING AN OPTICAL FIBER

[75] Inventor: Stefan A. Siegel, Princeton, N.J.
[73] Assignee: RCA Corporation, New York, N.Y.
[21] Appl. No.: 270,660
[22] Filed: Jun. 5, 1981
[51] Int. Cl.³ .............................................. C03B 33/09
[52] U.S. Cl. ........................................ 65/105; 65/112; 225/2
[58] Field of Search .................. 65/2, 4.21, 56, 105, 65/112; 225/2, 93.5

[56] References Cited

U.S. PATENT DOCUMENTS

| | | | |
|---|---|---|---|
| 3,406,886 | 10/1968 | Wesel et al. | 225/2 |
| 3,713,570 | 1/1973 | Heflich | 225/93.5 |
| 4,039,309 | 8/1977 | Albanese et al. | 65/2 |
| 4,113,162 | 9/1978 | Boehm et al. | 225/2 |
| 4,146,374 | 3/1979 | van Hoppe | 65/2 |
| 4,193,663 | 3/1980 | Timmermann | 350/96.18 |
| 4,216,004 | 8/1980 | Brehm et al. | 65/2 X |

FOREIGN PATENT DOCUMENTS 331411 7/1930 United Kingdom .............. 225/93.5

*Primary Examiner*—Richard V. Fisher
*Attorney, Agent, or Firm*—Birgit E. Morris; Donald S. Cohen; William J. Burke

[57] ABSTRACT

A simple, reliable, and inexpensive method for cleaving small diameter optical fibers comprises the steps of heating the fiber at a point along its length by contacting the fiber with an electrically heated wire and contacting the fiber, including the heated portion, with a volatile liquid whereby the fiber is cooled. The fiber may be cooled by spraying it with a liquid fluorocarbon.

4 Claims, 1 Drawing Figure

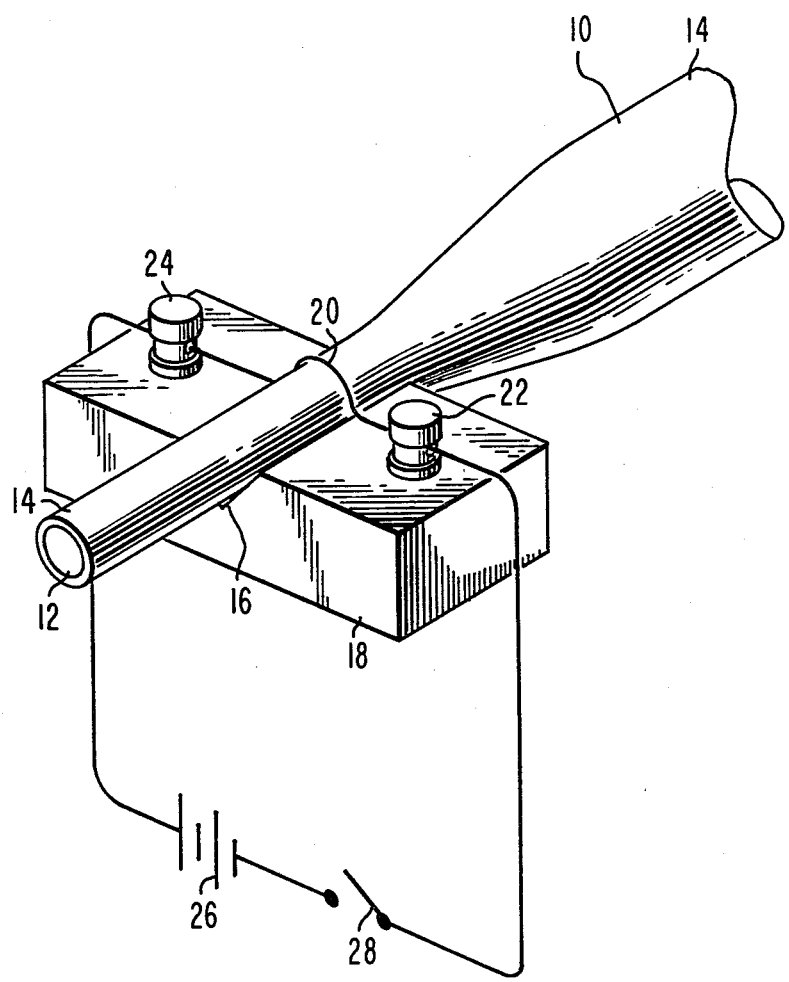

METHOD FOR CLEAVING AN OPTICAL FIBER

The Government has rights in this invention pursuant to Contract No. F33615-80-C-1093 awarded by the Department of the Air Force.

The invention relates to a method for cleaving of an optical fiber to produce a high quality end face on the fiber.

BACKGROUND OF THE INVENTION

Efficient coupling of light between one optical fiber and another, or between an electro-optic device and an optical fiber requires that the optical fiber have a mirror-like end surface perpendicular to the axis of the fiber. This condition must be met regardless of whether the coupling involves simple end-to-end coupling of optical fibers or the mounting of a microlens on the fiber end surface. Typically, a fiber is cleaved by scoring a surface at the desired point and then applying a tensile stress to the fiber, causing a crack to propagate across the fiber from the point of scoring. This method of cleaving often produces an irregular surface, particularly for fibers having a diameter less than about 20 micrometers. This problem becomes particularly important for single mode fibers where the fiber has been thinned by removal of a portion of the fiber cladding prior to cleaving. It would be desirable to have a method for cleaving an optical fiber, particularly a fiber having a small diameter, which is both simple, economical, and produces a mirror-like end surface on a fiber having a uniform or tapered diameter.

SUMMARY OF THE INVENTION

The invention is a method for cleaving an optical fiber comprising the steps of: locally heating the fiber at a point along its length by contacting the fiber to an electrically heated wire; and contacting the fiber, including the heated portion, to a volatile liquid, whereby the temperature of the fiber is quenched and the fiber is cleaved. Using this method a high yield of fibers, particularly fibers of small diameter, having a mirrorlike end surface is obtained.

BRIEF DESCRIPTION OF THE DRAWING

The FIGURE is a schematic illustration of a portion of the apparatus used to practice the method of the invention.

DETAILED DESCRIPTION OF THE INVENTION

Referring to the FIGURE, the method of the invention may be practiced by inserting an optical fiber comprising a core 12 and a cladding 14 into a groove 16 in a mounting block 18. The fiber may be either a multimode fiber having a typical core diameter of about 75 micrometers and a cladding thickness of about 120 micrometers, or it may be a single-mode fiber having a typical core diameter of about 5 to 10 micrometers and a cladding thickness of about 100 micrometers. Prior to cleaving the fiber, its diameter may be reduced, for example by an etching of the cladding, to facilitate the formation of a small F-number lens on the fiber end, as disclosed by Timmermann in U.S. Pat. No. 4,193,663, issued Mar. 18, 1980, and entitled COUPLING-EQUIPPED LIGHT GUIDE.

A heater wire 20, typically a nichrome resistance wire about 0.002 centimeter in diameter and having a resistance of about 34 ohms, is mounted transverse to the axes of the fiber 10 overlying the surface of the fiber and is connected to binding poles 22 and 24. The fiber is typically positioned under the wire using a micromanipulator while viewing the fiber and mounting block through a microscope. An electrical power source 26 is connected between the binding posts 22 and 24 to provide the electrical power to the wire 20. Typically, the source 26 has a current output capability of about 120 milliamps.

The switch 28 is then closed, causing an electrical current to flow through and thereby heat the wire 20. The fiber 10 is heated locally at the point where the wire 20 contacts the fiber 10. After a current-on time of about 30 seconds, a volatile liquid is contacted to the general area of the fiber which has been heated to provide a fast quench of the fiber temperature. Preferably, the liquid and fiber are contacted by spraying a liquid fluorocarbon, such as FREON, a trademark of the E. I. Dupont Company, Wilmington, Del., onto the fiber. The resultant thermal shock is usually sufficient to fracture the fiber cleanly. If the fiber does not fracture, the application of a tensile stress to an end of the fiber may be required to produce the fracture. Alternatively, the fiber may have a tensile stress applied prior to the cooling step, or even prior to the heating step.

I have employed this method to successfully cleave single mode optical fibers whose diameters have been etched down to between about 10 and about 20 micrometers. About 70 percent of the attempts to cleave such fibers resulted in a clean break with a mirror-like surface on the fiber end surface perpendicular to the fiber axes. Thus, this method provides a simple, reliable, and inexpensive method for cleaving small diameter optical fibers.

I claim:

1. A method for cleaving an optical fiber comprising the steps of
   heating the fiber at a point along its length by contacting the fiber with an electrically heated wire; and
   contacting the fiber, including the heated portion, with a liquid fluorocarbon, whereby the temperature of the fiber is quenched and the fiber is cleaved.

2. A method according to claim 1 further comprising the step of applying a tensile stress to the fiber during the quenching step.

3. A method according to claim 1 further comprising the step of applying a tensile stress to the optical fiber, including the portion to be heated, prior to the step of heating the fiber.

4. A method according to claim 1 wherein the step of contacting the optical fiber with a liquid fluorocarbon comprises spraying the fiber, including the heated portion, with the liquid fluorocarbon.

* * * * *